(12) United States Patent
Scholl et al.

(10) Patent No.: US 11,304,057 B2
(45) Date of Patent: Apr. 12, 2022

(54) AUTHORIZED ACCESS TO VEHICLE DATA

(71) Applicant: Intel Corporation, Santa Clara, CA (US)

(72) Inventors: Kay-Ulrich Scholl, Malsch (DE); Fabio Cesari, Ettlingen (DE)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 16/710,712

(22) Filed: Dec. 11, 2019

(65) Prior Publication Data

US 2020/0137575 A1   Apr. 30, 2020

Related U.S. Application Data

(63) Continuation of application No. 15/924,798, filed on Mar. 19, 2018, now abandoned, which is a continuation of application No. 14/124,450, filed as application No. PCT/US2013/056016 on Aug. 21, 2013, now Pat. No. 9,961,551.

(51) Int. Cl.
| | |
|---|---|
| *H04W 12/08* | (2021.01) |
| *G06Q 50/26* | (2012.01) |
| *H04W 4/46* | (2018.01) |
| *H04W 4/80* | (2018.01) |
| *H04W 12/50* | (2021.01) |
| *H04W 4/40* | (2018.01) |

(52) U.S. Cl.
CPC .......... *H04W 12/08* (2013.01); *G06Q 50/265* (2013.01); *H04W 4/40* (2018.02); *H04W 4/46* (2018.02); *H04W 4/80* (2018.02); *H04W 12/50* (2021.01)

(58) Field of Classification Search
CPC .................................................... H04W 12/08
See application file for complete search history.

(56) References Cited

U.S. PATENT DOCUMENTS 6,429,773 B1 *  8/2002  Schuyler ................. B60R 25/04
                                                     340/425.5
9,961,551 B2     5/2018  Scholl et al.
(Continued)

FOREIGN PATENT DOCUMENTS

CN         102568196         7/2012
CN         102831667        12/2012
(Continued)

OTHER PUBLICATIONS

"International Application Serial No. PCT US2013 056016, International Search Report dated May 23, 2014", 3 pgs.
(Continued)

*Primary Examiner* — Shelley Chen
(74) *Attorney, Agent, or Firm* — Schwegman Lundberg & Woessner, P.A

(57) ABSTRACT

Disclosed in some examples are methods, systems, and machine readable mediums which provide for controlled access of vehicle information by trusted authority systems. These systems may allow for police and other authority figures to utilize the onboard systems of the vehicle or obtain other information about the vehicle and occupants while safely in their own vehicles prior to an initial encounter with the vehicle and occupants.

29 Claims, 10 Drawing Sheets

(56) References Cited

U.S. PATENT DOCUMENTS

| | | | | |
|---|---|---|---|---|
| 2006/0007309 | A1* | 1/2006 | Machinist | G08G 1/146 348/143 |
| 2006/0142902 | A1* | 6/2006 | Hohl | G08G 1/0962 701/1 |
| 2006/0244633 | A1 | 11/2006 | Bahn | |
| 2007/0288127 | A1* | 12/2007 | Haq | B60R 25/10 701/2 |
| 2012/0066301 | A1* | 3/2012 | Holland | G06Q 50/01 709/204 |
| 2014/0279868 | A1* | 9/2014 | Astorg | G06Q 30/02 707/609 |
| 2015/0057838 | A1 | 2/2015 | Scholl et al. | |
| 2015/0142253 | A1* | 5/2015 | Nolting | G07C 5/0841 701/29.6 |
| 2019/0069179 | A1 | 2/2019 | Scholl et al. | |

FOREIGN PATENT DOCUMENTS

| | | | | |
|---|---|---|---|---|
| CN | 105637916 | | 6/2016 | |
| CN | 105637916 | | 11/2019 | |
| DE | 102011112703 A1 | * | 3/2012 | H04L 51/06 |
| DE | 102013211515 A1 | * | 12/2014 | G07C 5/02 |
| EP | 3036926 | | 8/2019 | |
| JP | 2005123958 | | 5/2005 | |
| JP | 2006107409 A | * | 4/2006 | |
| JP | 2007102434 A | * | 4/2007 | |
| JP | 2014169059 A | * | 9/2014 | |
| KR | 1020080004170 | | 1/2008 | |
| KR | 1020100107800 | | 10/2010 | |
| WO | 2005029438 | | 3/2005 | |
| WO | WO-2007090593 A1 | * | 8/2007 | B60K 37/06 |
| WO | WO-2008050136 A1 | * | 5/2008 | B60R 25/2018 |
| WO | 2015026341 | | 2/2015 | |

OTHER PUBLICATIONS

"International Application Serial No. PCT US2013 056016, Written Opinion dated May 23, 2014", 7 pgs.

"U.S. Appl. No. 14/124,450, Preliminary Amendment dated Dec. 6, 2013", 8 pgs.

"International Application Serial No. PCT US2013 056016, International Preliminary Report on Patentability dated Mar. 3, 2016", 9 pgs.

"European Application Serial No. 13891949.3, Extended European Search Report dated Jan. 31, 2017", 8 pgs.

"U.S. Appl. No. 14/124,450, Non Final Office Action dated Apr. 3, 2017", 8 pgs.

"U.S. Appl. No. 14/124,450, Response filed Aug. 3, 2017 to Non Final Office Action dated Apr. 3, 2017", 10 pgs.

"European Application Serial No. 13891949.3, Response filed Aug. 25, 2017 to Extended European Search Report dated Jan. 31, 2017", 15 pgs.

"U.S. Appl. No. 14/124,450, Notice of Allowance dated Dec. 14, 2017", 8 pgs.

"Chinese Application Serial No. 201380078389.5, Office Action dated Jun. 1, 2018", W English Translation, 20 pgs.

"Chinese Application Serial No. 201380078389.5, Response filed Sep. 19, 2018 to Office Action dated Jun. 1, 2018", w concise statement of relevance, 8 pgs.

"Chinese Application Serial No. 201380078389.5, Office Action dated Jan. 25, 2019", W English Translation, 10 pgs.

"Chinese Application Serial No. 201380078389.5, Response filed Apr. 9, 2019 to Office Action dated Jan. 25, 2019", w English Claims, 15 pgs.

"Chinese Application Serial No. 201380078389.5, Office Action dated Apr. 25, 2019", W English Translation, 12 pgs.

"U.S. Appl. No. 15/924,798, Non Final Office Action dated Jun. 13, 2019", 8 pgs.

"Chinese Application Serial No. 201380078389.5, Response filed Jul. 9, 2019 to Office Action dated Apr. 25, 2019", w English Claims, 32 pgs.

* cited by examiner

AUTHORIZED ACCESS TO VEHICLE DATA

PRIORITY

This application is a continuation of U.S. application Ser. No. 15/924,798, filed Mar. 19, 2018, which is a continuation of U.S. application Ser. No. 14/124,450, filed Jun. 4, 2014, now issued as U.S. Pat. No. 9,961,551, which claims the benefit of priority to U.S. National Stage Application under 35 U.S.C. 371 from International Application No. PCT/US2013/056016, filed Aug. 21, 2013, all of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

BACKGROUND

Police and other authority figures are placed in dangerous situations every day, which may be caused in part by a lack of complete situational awareness. For example, when a police officer stops a car at the side of the road, the police officer may be able to ascertain information on the owner of the car based upon the car's license plate, but may not know who is actually driving the car or what is happening in the car until they approach the car. Once the officer approaches the car, the officer is in a vulnerable situation. This may lead to the poor relations between the officer and the occupants as the officer is naturally suspicious and cautious and the occupants may take offense to the officer's suspicious demeanor.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
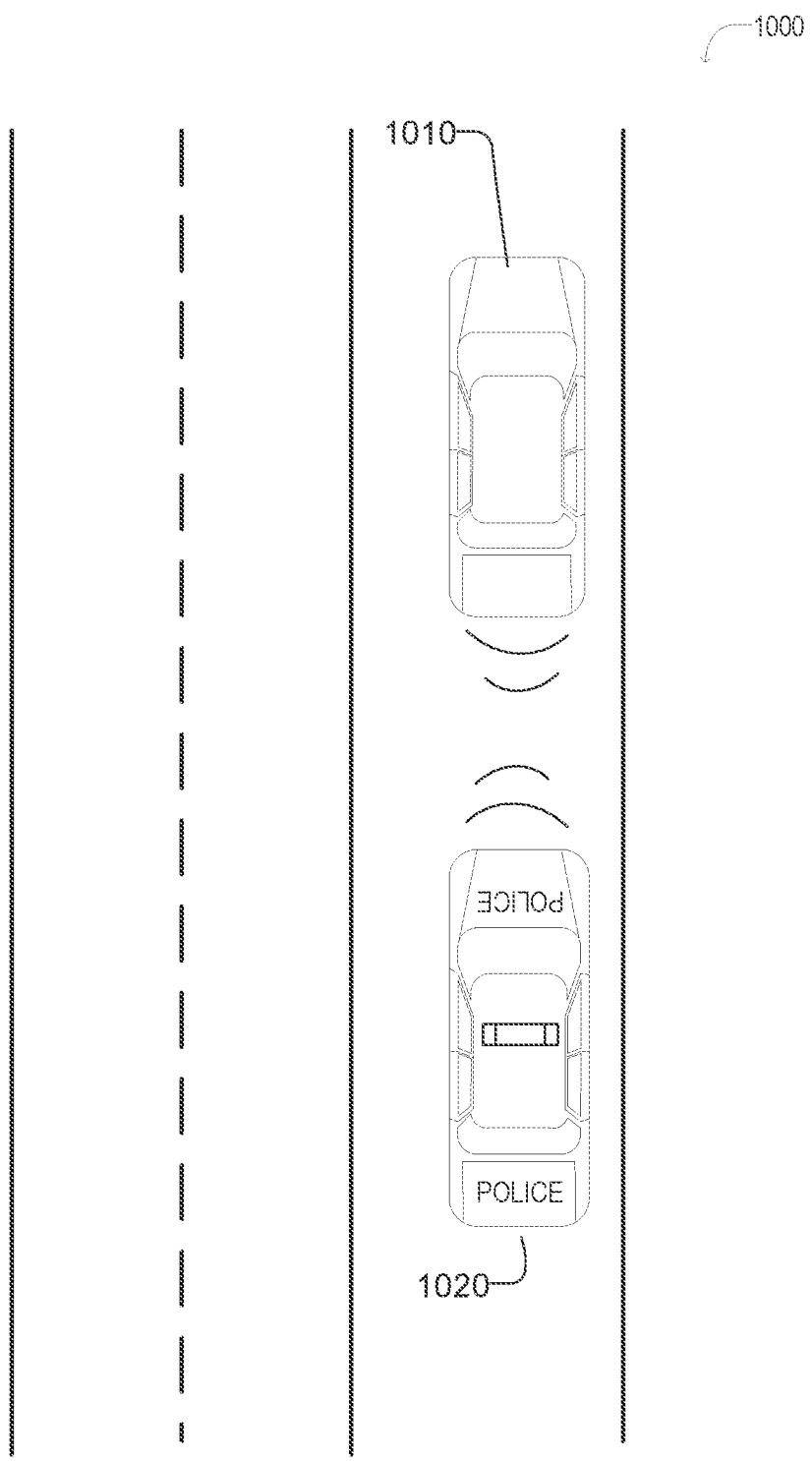
FIG. 1 is an illustration of an example scenario in which the present disclosure may be applicable according to some examples.

In the case of a traffic stop, if the officer has additional information on the occupants of the vehicle and any possible threats therein, the officer may be better prepared for the situation in the vehicle. If the vehicle is not a threat, the officer may be friendlier to the occupants, which may improve relations.

Disclosed in some examples are methods, systems, and machine readable mediums which provide for controlled access of vehicle information by trusted authority systems. These systems may allow for police and other authority figures to utilize the onboard systems of the vehicle or obtain other information about the vehicle and occupants while safely in their own vehicles prior to an initial encounter with the vehicle and occupants.

In some examples a trusted authority system may be a computing system utilized by an authorized individual in accordance with official public duties. For example, a computing system of a police vehicle, a fire vehicle, an ambulance, or the like. In some examples, the trusted authority system may be a computer system integrated into a vehicle. The trusted authority system may communicate with a data authority system which may provide information to the trusted authority about the vehicle and/or its occupants.

In some examples, the data authority may be a computing system integrated with, or onboard a civilian or other vehicle. In some of these examples, the data authority system and the trusted authority system may communicate with each other through point to point wireless communication. For example, the trusted authority and the data authority may communicate using one or more wireless communication protocols such as a point to point cellular protocol, a point to point wireless local area network (WLAN) protocol such as a Wi-Fi Direct® protocol operating in accordance with one or more Institute for Electrical and Electronics Engineers (IEEE) 802.11 standards such as 802.11n-2009, a Bluetooth® protocol such as a Bluetooth protocol complying with version 4.0, a Zigbee® protocol, a Near Field Communication (NFC) protocol, or the like. In other example, the trusted authority and the data authority may communicate through a network which may be accessed in a variety of wired and non-wired ways. In still yet other examples, the trusted authority and the data authority may each communicate with an intermediate server over a network. In these examples, the data authority may be considered to encompass both the computing components integrated with, or proximate to the vehicle that collects the data about the vehicle and its occupants and portions of the intermediate server. The data authority may send data to the intermediary who may authenticate and provide the data to the trusted authority.

The data authority system may collect and store data from various integrated systems aboard the vehicle to provide this data to a trusted authority system. Example data collected may include video or still images from on-board cameras, backup cameras, car data such as speed data, direction data, global positioning system data, seat sensor data (e.g., most cars come equipped with sensors to detect whether a passenger is present for airbag deployment), window states (e.g., open/close), glove box states (opened or closed), door status (open, closed, locked, unlocked), status of various information and entertainment devices (e.g., radios, movie players), and the like. The data authority system may collect this information at the time of request by the trusted authority system, or may collect this data automatically, storing it for a period of time. For example the data authority system may log this data for the last 5 minutes, the last hour, the last day, the last week, or the like. In other examples, the data authority may not store the data, but may transmit the data to an intermediary server, which may store the data for a predetermined period of time.

The data authority system may also communicate with other systems in the car not integrated into the car itself. For example, government issued identification cards such as a driver's license may contain near field communications (NFC) technologies such as Radio Frequency Identification (RFID) tags. The vehicle may be equipped with a Near Field Communication (NFC) reader that may extract an identification number from the identification card. The data authority system may then identify to the trusted authority system the identification numbers of the occupants of the vehicle. The trusted authority may then utilize the identification numbers to lookup the names and criminal histories of the vehicle occupants. Another example would be insurance cards equipped with NFC communications technologies. The data authority may collect information on the insurance status of the vehicle and provide insurance information to the trusted authority. In yet other examples, the insurance card may include contact information (e.g., a Uniform Resource Locator (URL), Uniform Resource Identifier (URI), or other identifier) and account information and either the data authority or the trusted authority may utilize the contact information and the account information (or the vehicle information—such as license plate) to contact the insurance company (or a third party authorized by the insurance company) to determine coverage status.

Additional external devices that the vehicle may connect to include one or more personal computing devices such as smartphones, cellular phones, tablet computers, laptop computers, or the like. The vehicle may provide data about these devices to the trusted authority. For example, if the devices are on, whether the devices are currently engaged in communications such as making a phone call, or the like.

FIG. 1 is an illustration of an example scenario 1000 in which the present disclosure may be applicable according to some examples. Police car 1020 has vehicle 1010 pulled over onto the side of the road. While the police officer is still in the safety of his or her vehicle 1020, the trusted authority system in the police car 1020 may wirelessly communicate with a data authority inside vehicle 1010 to obtain information about the vehicle's occupants, the various systems of the vehicle 1010 and the like.

Figure 2:
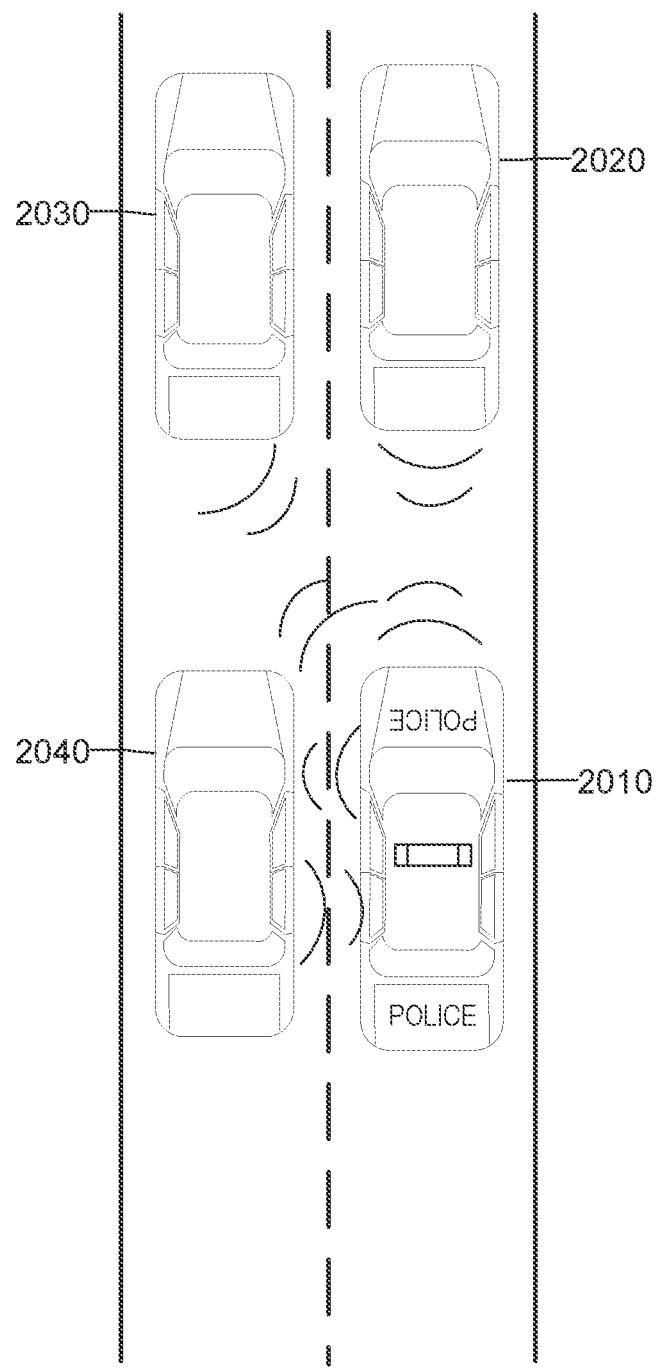
FIG. 2 is another illustration of an example scenario in which the present disclosure may be applicable according to some examples.

FIG. 2 is another illustration of an example scenario 2000 in which the present disclosure may be applicable according to some examples. Police car 2010 is driving in traffic surrounded by cars 2020-2040. Police car 2010 may communicate with proximate vehicles 2020-2040 to gather information regarding the vehicles, such as license plate information. For example, police cars often have license plate scanning systems that allow it to scan license plates of cars that are in a line of site with the scanning device (e.g., car 2020). This allows the police cars to find stolen cars, cars owned by individuals wanted by the authorities and the like. These systems are limited to situations in which the system may see a license plate and are based on sometimes inaccurate optical character recognition techniques.

Instead of or in addition to these systems, in some examples, the trusted authority in the police car 2010 may wirelessly communicate using a short range wireless communication technology with cars 2020-2040 to determine their license plate numbers. The data authority in the car 20:20-2040 may store the license plate number of the car, or may determine the license plate numbers from MD or other short range communications with the license plates themselves and then provide it to the police car 2010 upon request. In some examples, this may be done without the knowledge of the occupants of the vehicles 2020-2040 (as a license plate number is public information).

Figure 3A:
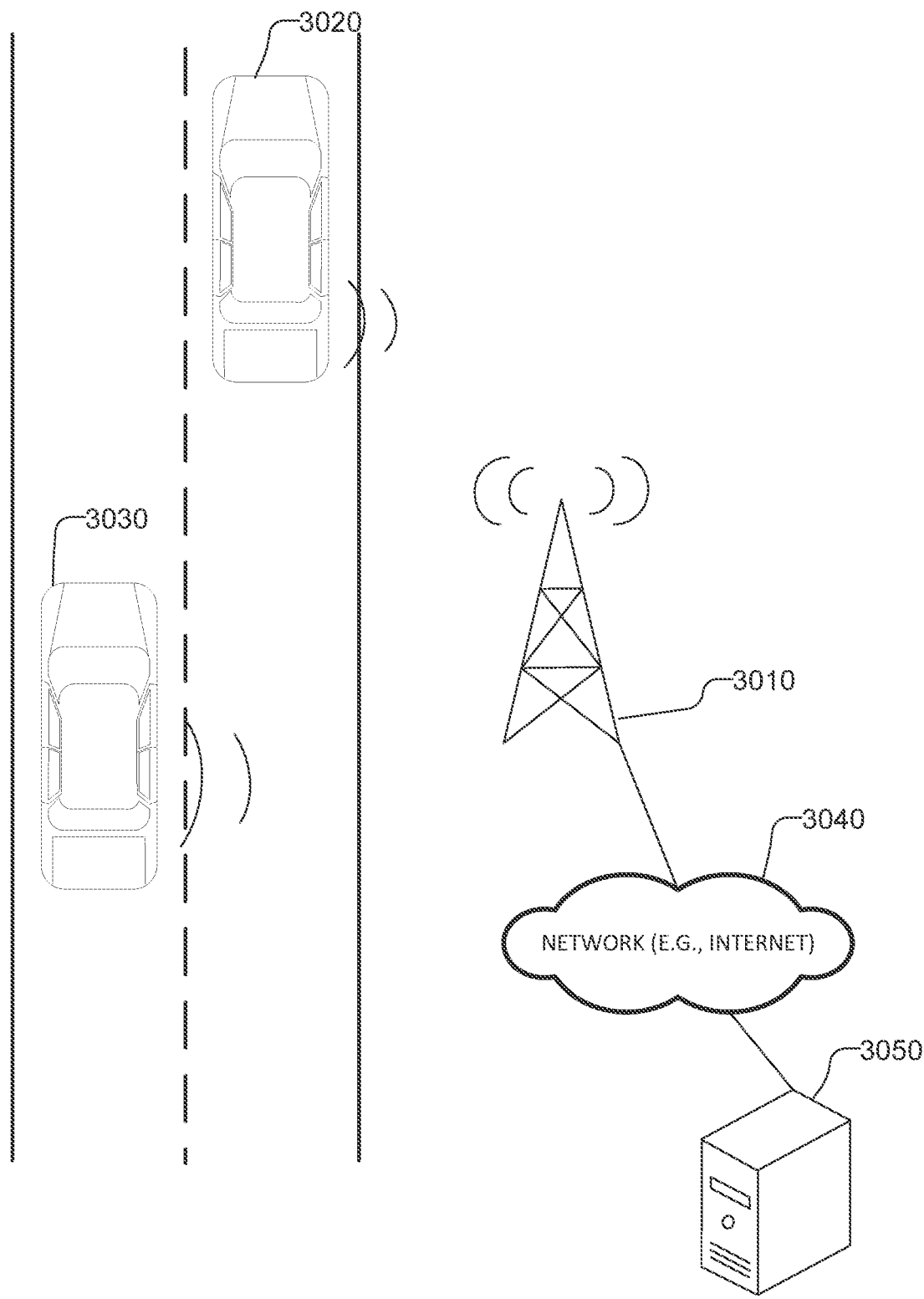
FIG. 3A is another illustration of an example scenario in which the present disclosure may be applicable according to some examples.

FIG. 3A is another illustration of an example scenario in which the present disclosure may be applicable according to some examples. FIG. 3A shows a variant of the situation in FIG. 2. In the example of FIG. 3A, instead of a police car, the trusted authority is a stationary system 3010. Cars 3020-3030 pass stationary system 3010 and communicate license plate information to stationary system 3010. In some examples, a network of stationary systems 3010 may be setup which may relay license plate, or any other collected information to central computing systems 3050 over network 3040. Network may be or include portions of a Wide Area Network (WAN), Local Area Network (LAN), cellular network, Wireless Local Area Network (WLAN), or the like. The central computing systems 3050 may determine one or more vehicles of interest and forward this information to police or emergency services dispatch. Central systems 3050 may also determine speed of the vehicle based the time it takes a car to travel between two stationary systems 3010 and the known distance between the stations.

Figure 3B:
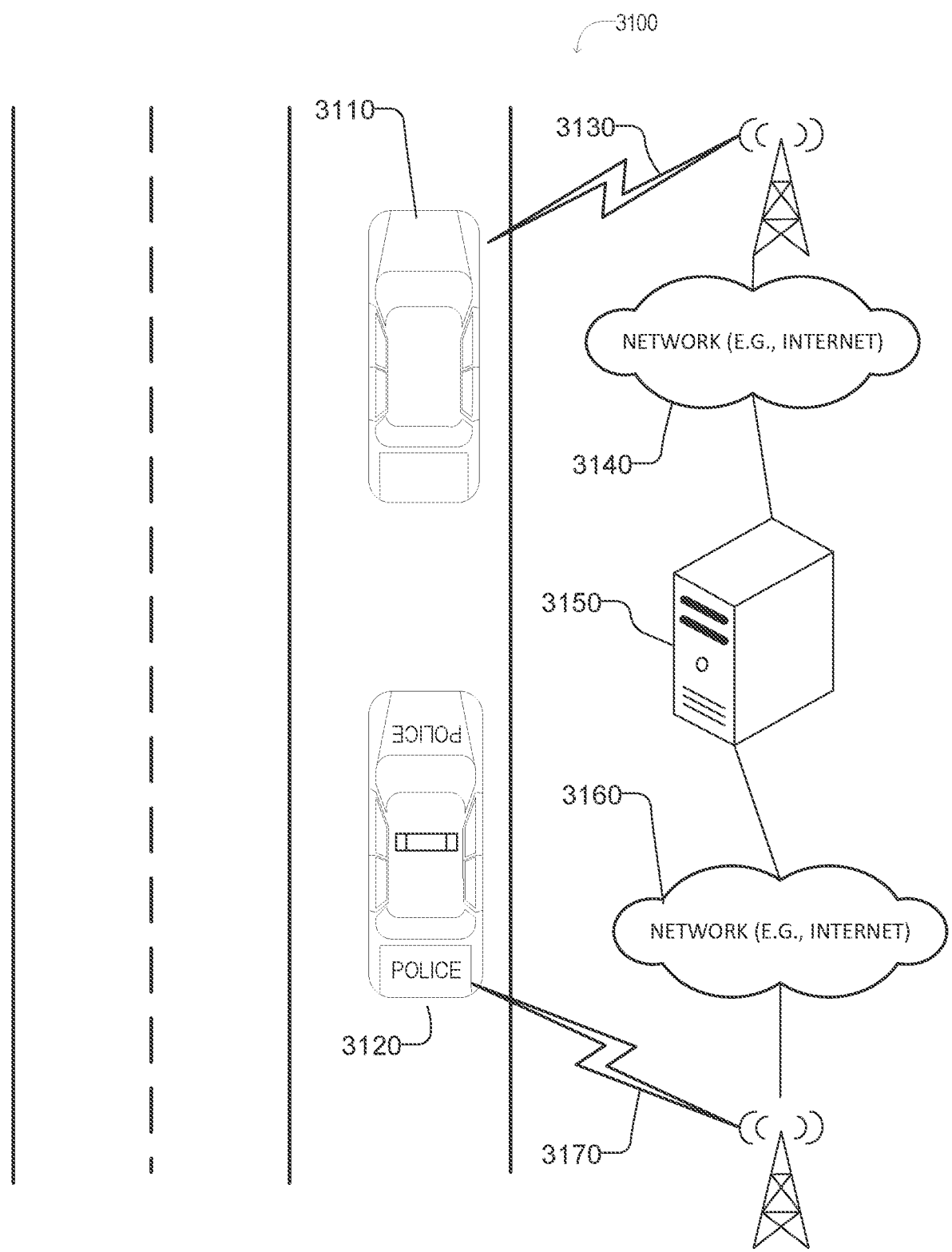
FIG. 3B is another illustration of an example scenario in which the present disclosure may be applicable according to some examples.

FIG. 3B is another illustration of an example scenario in which the present disclosure may be applicable according to some examples. FIG. 3B shows another variant of the examples provided in FIG. 1. In this example, the data authority may be comprised of portions on vehicle 3110 and server 3150. The data authority may transfer sensor data (either periodically as the vehicle is in motion, or when requested by the trusted authority) to server 3150 over network 3140. Vehicle 3110 may access network 3140 over any data connection, but in some examples, access may be a wireless link 3130 (e.g., a cellular connection, or other long range link), Similarly, authority system 3120 may contact server 3150 over network 3160. This connection too may be via a wireless link 3170. Networks 3160 and 3140 may be the same network, may be different networks, or may include portions of each other.

Other scenarios are contemplated, including the use of data authority systems communicating with other data authority systems to determine slow traffic conditions ahead, an accident situation, convey weather information, or the like. In an example, after an accident, the data authority may contact nearby vehicles to ascertain the identities of possible witnesses and may even request the sensor data of those witness vehicles, and/or request that they store their sensor data for a period of time.

While described herein that the data authority provides data to the trusted authority, in other examples, the trusted authority may provide data to the data authority. For example, administrative information such as car tax information, car insurance certificates, car registration information, or the like may be "pushed" to the data authority by the trusted authority. For example, when the car registration payment is made, the trusted authority (which may be located in an administrative office) may push the payment details to the data authority. This information may then be queried by another trusted authority (e.g., a police stop) at a later time. In yet other examples, the trusted authority may communicate with the data authority to collect taxes, registration, and other administrative fees and expenses. For example, the trusted authority may send a virtual "bill" to the data authority. The data authority may then send payment details to the trusted authority. The trusted authority, once payment is verified, may send verification to the data authority.

Data security may be employed to protect this data both in storage on the data authority and in transit to the trusted authority. To securely store this data, the data may be encrypted with a public key of the data owner. The data may only be decrypted by the owner's private key. If the user gives permission to send data to the trusted authority, the data may be decrypted with the private key, and then re-encrypted with a different key, such as the trusted authority's public key, for over the air transfer. The trusted authority may then decrypt this information using its private key. In order for the trusted authority to verify that the data is indeed coming from the data authority of the subject vehicle, the data authority may digitally sign the message containing the data, or a portion of the message by calculating a checksum of the message and encrypting the checksum with the user's private key. The trusted authority may then independently compute the checksum of the data and by utilizing the data authority's public key, the trusted authority may decrypt the checksum sent by the data authority. If the checksum calculated by the trusted authority matches the checksum provided by the data authority, then the trusted authority knows that the message was sent by the data authority (as only the data authority's public key may decrypt the checksum) and that the message was not altered (as the checksum must match).

In some examples, the trusted authority and the data authority may utilize a certificate authority and digital certificates to exchange encryption keys. In some examples, this may be accomplished by utilizing a network connection such as a network connection provided by a long range wireless link. For example, the license plate on the vehicle in which the data authority is located may serve as, or part of, a Universal Resource Identifier (URI). The trusted authority may send this URI to a certificate authority using a network connection to obtain the vehicle's public key for use in verifying the digital signature of the data and for encrypting other communications to the data authority.

The data authority may also utilize a certificate authority to obtain the public key of the trusted authority. For example, the data authority may utilize a URI provided by the trusted authority, a URI that comes preinstalled on the data authority (and which may be updatable), a license plate number of the trusted authority, or the like to request the public key of the trusted authority. The certificate authority may maintain a list of URIs which correspond to trusted public authorities. If an intruder impersonates the URI of a trusted authority, they will not be able to decrypt the communications from the data authority unless they also steal the private key of the trusted authority. Additionally, URIs not recognized as trusted authorities will not return a successful public key from the certificate authority. Thus, if messages from the trusted authority are successfully decrypted, the data authority may have a level of confidence that the trusted authority is a legitimate trusted authority (as opposed to an unauthorized eavesdropper).

In addition to being protected while stored and protected in transit, the data may be subject to strict access and usage controls. For example, various permission based checks may be utilized to control the initial data access and Digital Rights Management (DRM) may be utilized to control the data after the data is sent. For example, sophisticated rules may be setup by the user which controls access and privileges for the trusted authority. These rules may specify what actions the data authority is to take based upon the requested access level. Users may setup rules such that all requests for certain data types may be allowed, denied, or at the time of request the system may prompt the user. Further granular control may be introduced by allowing the user to specify DRM controls on how the information may be used by the trusted authority. Example access permissions may include presentation rights, storage rights, rights to retransmit the data to other systems, and the like. These permissions may be additive—e.g., the right to store may include the right of presentation, the right of retransmission may include storage and presentation. In other examples, these rights may be independent—that is, an explicit grant may be needed for each proposed usage. An example rule may take the form: if the trusted authority asks for <data type> with rights to <view|store|retransmit|modify>then <grant|deny|prompt>

These rules may apply per vehicle and may be setup by the owner of the vehicle. These rules may apply regardless of who is in the car or who is driving. In other examples, a set of these rules may form a profile, and each driver of the vehicle may have a profile. In these examples, the vehicle may identify the driver by communication with NFC chips in the driver's license of the driver, through user input, or other identification means. The data authority may utilize the profile of the driver to determine the access rules and conditions. In other examples, other occupants may create profiles or rules pertaining to their personal data (e.g., identity from their driver's license).

The use of DRM may alleviate user privacy fears, such as the fear that the information may be used against them in a court of law. In addition, the DRM may be utilized to prevent modifications to the data in the event the data is recorded. As already noted, the data authority and the trusted authority may negotiate a level of access granted to the data authority for the data based upon user permissions.

Figure 4:
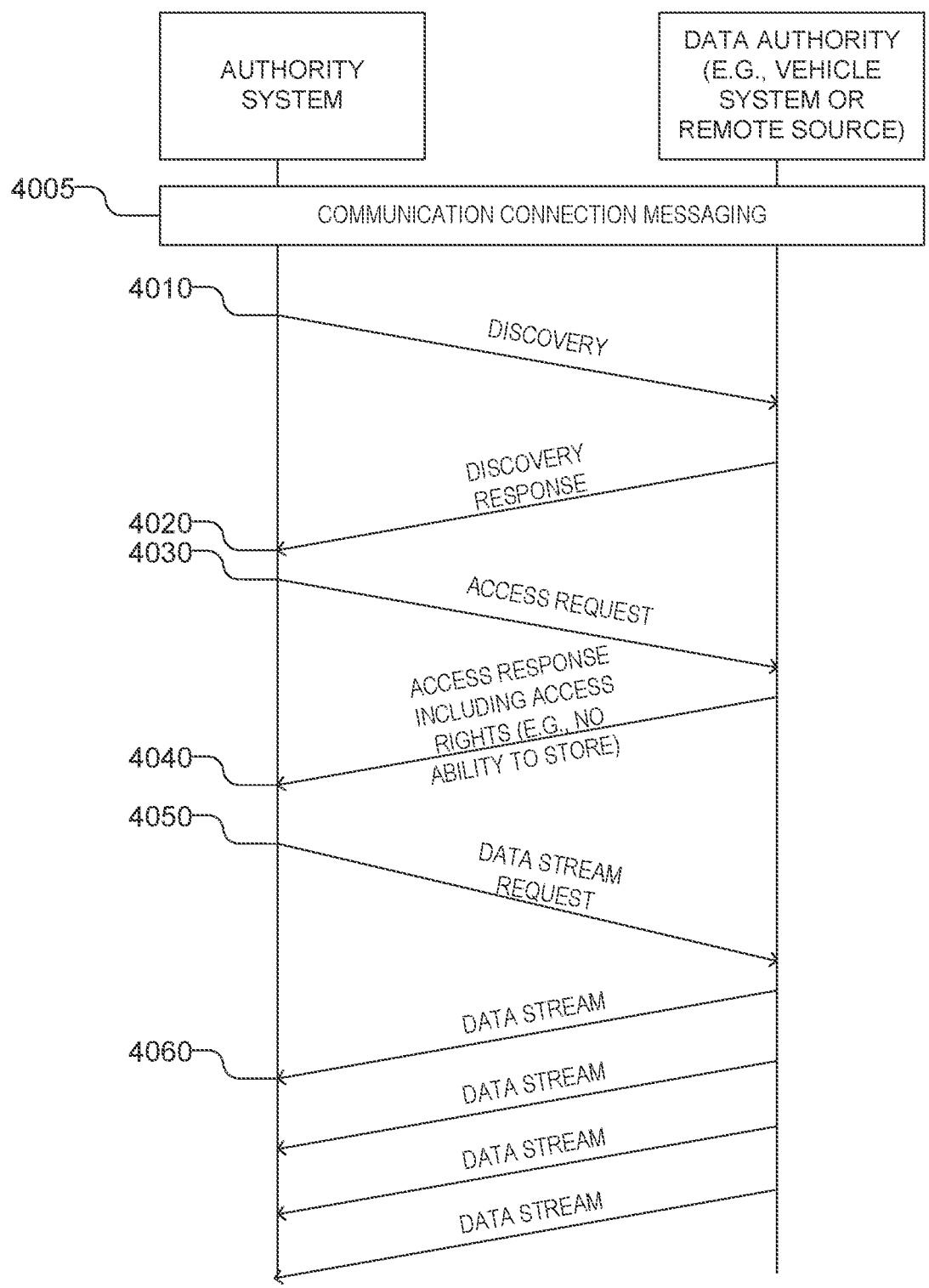
FIG. 4 is a message sequence chart showing data transfer from a data authority to a trusted authority system according to some examples of the present disclosure.

FIG. 4 is a message sequence chart showing data transfer from a data authority to a trusted authority system according to some examples of the present disclosure. At operation 4005 the trusted authority system may establish a communication connection with a data authority. For example, various Bluetooth or Wi-Fi messaging which establishes a communication session between the trusted authority system and the data authority may be sent. In other examples, the trusted authority system may contact the data authority over a network. In these examples, a location register may be utilized that stores a record of a current IP address of a data authority for the vehicle. For example, the data authority may have an Internet Protocol (IP) address associated with it as the result of a long range wireless link. The data authority may periodically report to the location register a unique identifier (e.g., Vehicle identification Number (VIN), license plate number, URI, or the like) and its current IP address. The trusted authority system may then contact the location register and supply the unique identifier. The location register may then supply the IP address which the trusted authority system may then use to contact the data authority. In some examples, the data authority may be, or report to, a central server which may store data reported by various vehicles. To identify the vehicle of interest to the central server, the trusted authority system may utilize a license plate number or other identifier of the vehicle such as an embedded RFID tag of the vehicle, Vehicle Identification Number (VIN) of the vehicle, or the like.

Once the communication session is set up, at operation 4010, the trusted authority system may send a discovery message to the data authority to determine if the data authority is available to send data to the trusted authority system. This discovery message may be sent after any connection and synchronization messaging necessary in order to establish any connections utilizing a wireless communication protocol such as Bluetooth or Wi-Fi. At operation 4020, the data authority may respond with an indication of whether or not the data authority is available to send data. In some examples, the availability response may indicate the available types of data (e.g., which sensor data is available). The trusted authority system may then send an access request 4030 which may request access to one or more data items stored by or obtainable by the data authority. The access request 4030 may specify a requested a level of access to the data items (e.g., display, store, retransmit, or the like). In some examples the access request message may contain an URI of the trusted authority system. The data authority may then utilize the URI of the trusted authority system to obtain the trusted authority system's digital certificate containing its public key. In some examples, the digital certificate may be obtained over a wireless link (e.g., a cellular link).

The certificate authority may provide public keys corresponding to the data authority and the trusted authority system. This may assist the data authority in verifying the identity of the trusted authority and vice versa. In some examples, there may be a separate class of URIs reserved for public authorities. These URIs may be made available to only trusted authorities and no-one else. The data authorities (e.g., the vehicle systems) may submit a request to the certificate authority which indicates that this is a request by a trusted authority system. The certificate authority may check to make sure that the URI provided is one of the issued URIs for authority vehicles. If the URI is valid, the certificate authority may return the digital certificate. If the URI is not valid, an error may be returned. If an error is returned, the data authority may not respond to any more messages from the trusted authority system until a valid URI is given. Since the returned public key is a legitimate trusted authority public key, and as long as the trusted authority private keys are protected, only a legitimate trusted authority may access the data as only the trusted authority private key may decrypt information encrypted with the trusted authority's public key.

In some examples, the data authority may also include a Global Positioning System (GPS) coordinate of the data authority in the digital certificate request to the certificate authority. The certificate authority may then have a geofence in which the particular trusted authority URI is allowed to operate (e.g., the jurisdiction of the trusted authority). If the URI is valid, but not in the correct geofence, the certificate authority may deny the request and the data authority may ignore requests from the trusted authority until a valid URI for that location is submitted. This may prevent trusted authority systems from operating outside their jurisdictional limits. For example, a New York City police officer operating in California would not be able to access data authorities from California drivers in California.

The data authority may respond with an access response 4040, including the level of access (DRM) that the data authority is willing to grant for the data items. The response may also include the URI of the data authority, which may enable the trusted authority system to obtain a digital certificate to encrypt any data items sent to the data authority. The access response may be encrypted with the public key of the trusted authority system as obtained from the certificate authority. Only the actual owner of the private key corresponding to the public key used to encrypt the message will be able to view the contents of the message. Since the private keys of the trusted authorities should only be in the hands of authorized systems, those authorized systems will be the only systems able to decrypt further messages from the data authority. In the same way that the data authority utilized the certificate authority, the trusted authority may utilize the certificate authority in order to assure that it is communicating with a valid data authority for the correct vehicle. For example, the license plate number, vehicle identification number, or other identification of the vehicle may be utilized to obtain the private key of the data authority. Since the public key is tied to a physical identifier, the trusted authority may have some confidence that the data provided is legitimate.

If the trusted authority system agrees to the access level provided, the trusted authority system may then request access to the data items using a request message 4050. The request message may be encrypted with the data authority's public key. Only the data authority may view this message by decrypting it with the data authority's private key. In some examples, the message may be also digitally signed with the trusted authority's private key. If the data authority is able to decrypt this digital signature using the public key of the trusted authority system, then the data authority may have confidence that the trusted authority system sent the particular message.

The request message 4050 may request data items once (e.g., status) or may request a stream of data items (e.g., video stream, a stream of sensor data that updates to reflect current values, or the like). If the request message is properly authenticated, the data authority may encrypt the data items and begin sending them (in some examples, streaming them) to the trusted authority system at 4060.

In some examples, the data authority system may ask permission from the vehicle occupants prior to approving the request from the trusted authority system. As already noted, the data authority system may allow the vehicle owner to setup a profile which describes the particular data items collected and gives the owner the option of allowing access, allowing limited access, prompting the occupants, or denying access.

In some examples, prior to sending the data streams 4060 the data authority may gather the sensor data. For example the data authority may query short range wireless sensors in driver's licenses, insurance cards, or the like. The data authority may also query other sensors in the car, turn on cameras, turn on voice recorders, or the like.

Figure 5:
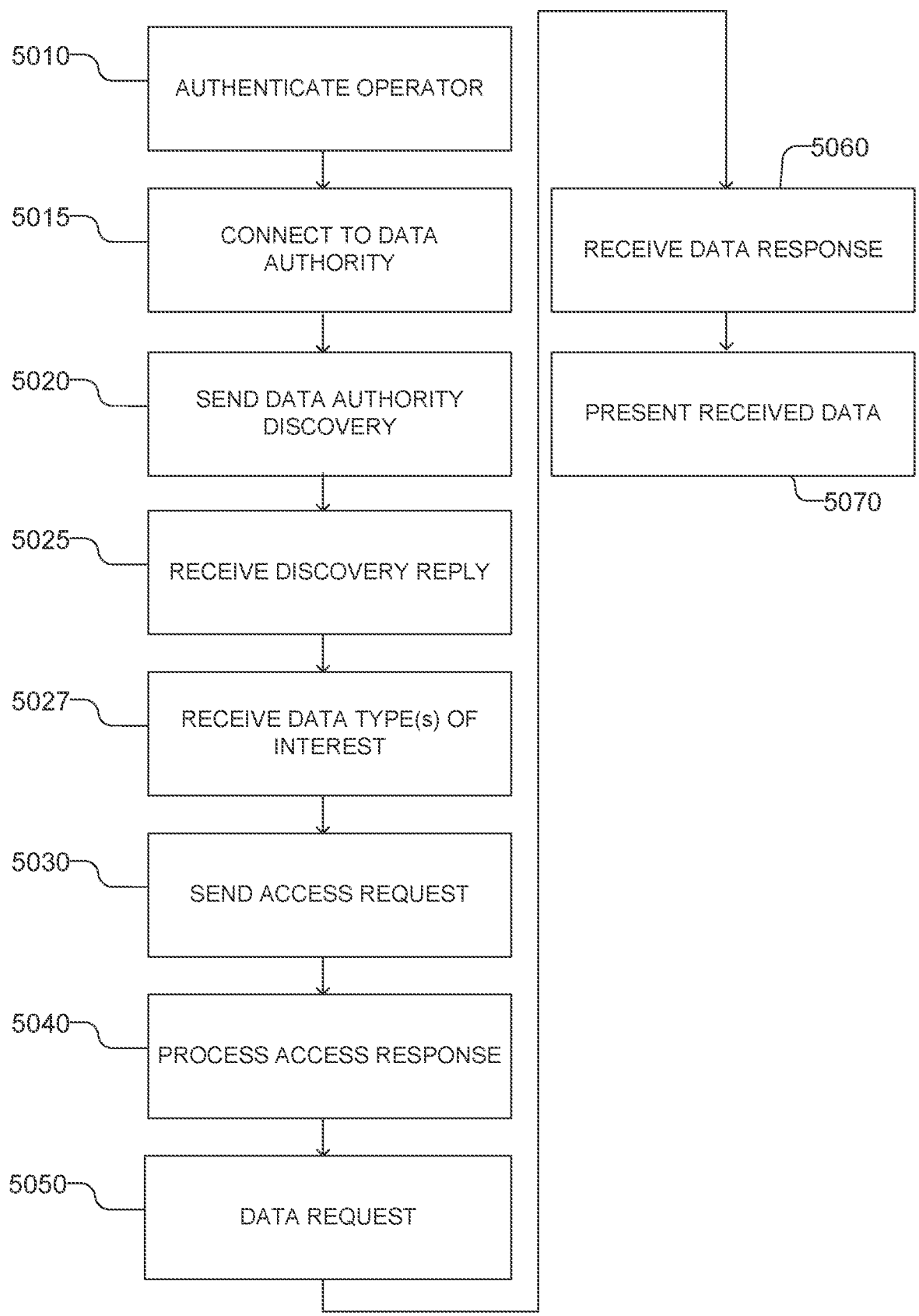
FIG. 5 shows a flowchart of a method of retrieving data from a data authority according to some examples of the present disclosure.

Turning now to FIG. 5 a method 5000 of a retrieving data from a data authority performed by a trusted authority computing system is shown. At operation 5010 the trusted authority computing system may authenticate the operator. For example, the trusted authority system may require user credentials to ensure that only authorized users will have access to the data and capabilities of the trusted authority computing system. In some examples, the user credentials may include a username/password, biometric data, a challenge question and response, a physical access card, or any other method of authentication.

Once the user of the trusted authority system is authenticated, at operation 5015, the user of the trusted authority computing system may connect to a data authority system. For example, the data authority may discover and connect via BLUETOOTH, or some other short range wireless protocol, to the data authority. In other examples, the trusted authority may discover an IP address of the data authority and connect over a network. For example, the trusted authority may contact a location register to obtain an IP address of the data authority. The trusted authority may then contact the data authority using a network connection. For example, both the trusted authority and the data authority may be connected to a network (e.g., the Internet) over separate long range wireless connections. Once the trusted authority is connected to the data authority, the trusted authority may initiate a data authority discovery process at operation 5020 to ensure that the data authority is valid and communicating. At operation 5025 the trusted authority may receive a response, which may include the data that is available to the trusted authority. The available data types may be displayed to the authority figure for selection. At operation 5027 the trusted authority may receive the selection of the data types the authority figure is interested in obtaining.

Once the data authority is discovered, the trusted authority computing system may send an access request at operation 5030 specifying the one or more data items that the authority figure wishes to access and the desired access level. This access request may include a URI or other identifier of the trusted authority to enable the data authority to properly encrypt any response by locating the proper encryption keys.

At operation 5040, the trusted authority may receive the access response and process it. For example, the trusted authority may decrypt the access response. In some examples the message may specify the available data and the DRM restrictions. The message may also include a URI of the data authority. The trusted authority may then contact a certificate authority to get a public key for this data authority. The information on the available data may be displayed to the authority figure for review. The authority figure may then choose which data to request. At operation 5050, the trusted authority may then request the chosen data. This message may be encrypted with the data authority's public key, At operation 5060, the data may then be received from the data authority. This data may be encrypted by the data authority, and thus may need to be decrypted using the public authority computing system's private key. The trusted authority may then present the received data at operation 5070 (e.g., such as by storing, displaying or playing, retransmitting or otherwise consuming the data consistent with the digital rights management restrictions).

Figure 6:
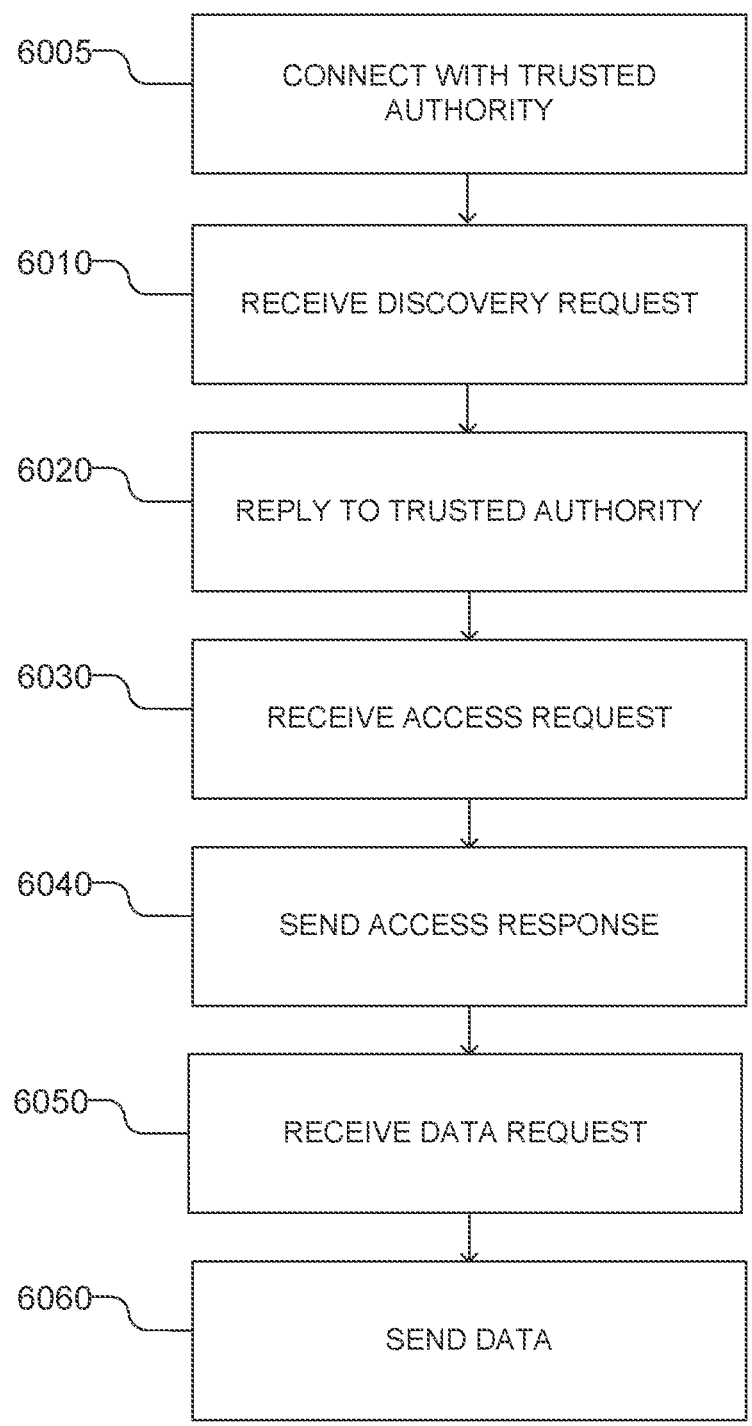
FIG. 6 shows an example of a method of providing data to a trusted authority by a data authority according to some examples of the present disclosure.

FIG. 6 shows one example of a method of providing data to a trusted authority by a data authority according to some examples of the present disclosure. At operation 6005 the data authority and the trusted authority may establish a communication session as previously described. At operation 6010 the data authority may connect with the trusted authority and receive a discovery request attempting to discover a data authority system. The data authority may send a reply to the trusted authority at 6020. This reply may indicate the types of data available and the DRM associated with that data. At operation 6030 the data authority may receive an access request from the trusted authority. The access request may contain a URI or other identifier of the trusted authority. This identifier may allow the data authority to contact a certificate authority to get a public key for the trusted authority. If the data authority is successful at getting a public key, at operation 6040 the data authority may respond with an access response. The access response may be encrypted with the trusted authority's public key and may contain the vehicle's URI or other identifier as well as the access restrictions on the requested data. At operation 6050 the data authority may receive a data request. The data request may be decrypted using the private key of the data authority. At this point the data authority may collect the required data by either contacting the various sensors or systems or by retrieving the data from storage. At operation 6060 the data authority may send the requested data to the trusted authority system.

Figure 7:
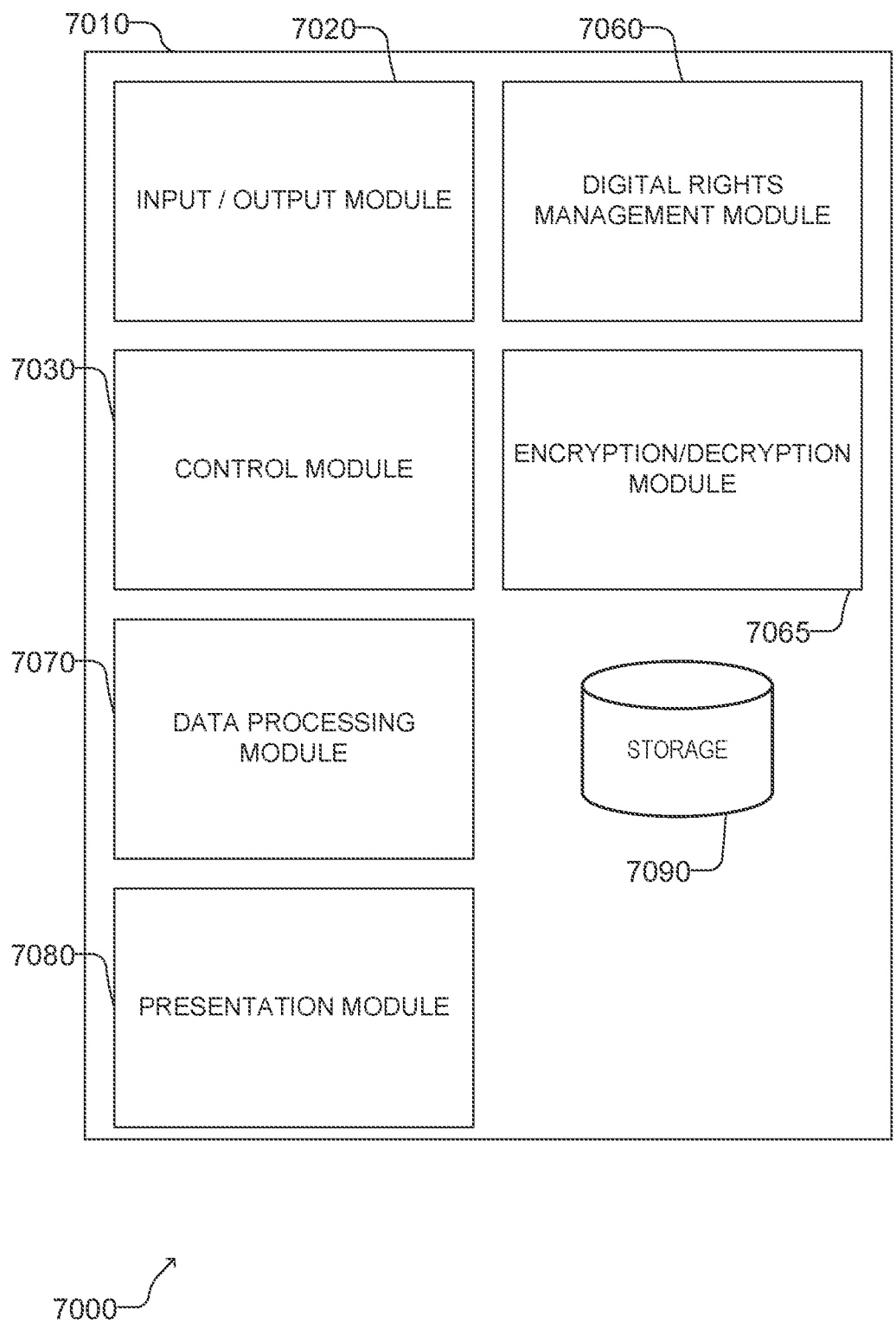
FIG. 7 shows an example schematic of a trusted authority according to some examples of the present disclosure.

FIG. 7 shows an example schematic 7000 of a trusted authority 7010 according to some examples of the present disclosure. Input/output module 7020 may communicate with the data authority to make data inquiries and to receive sensor data. Input/output module 7020 may communicate with the data authority through short range wireless links such as BLUETOOTH, Wi-Fi, Wi-Fi Direct, ZigBee, Near Field Communications (NFC), or the like. Input/output module 7020 may also communicate with the data authority over a network through a long range wireless link such as $4^{th}$ generation wireless data links (e.g., Long Term Evolution (LTE)), $3^{rd}$ generation wireless data links (e.g., Universal Mobile Telecommunications Service (UMTS), $2^{nd}$ generation wireless links (e.g., such as General Packet Radio Service (GPRS)) or the like. Input/output module 7020 may also communicate with the data authority over a network through a wired link such as an Ethernet link, a fiber optic link, a POTS (Plain Old Telephone System) link, or the like. As already noted, the data authority may be a computer system in the vehicle which may be accessed directly through one or more wireless links, or indirectly through a network (e.g., the Internet). In addition, the data authority may instead be located at least partially at a central server. The trusted authority system may then contact the central server over a network and communicate with the central server. The central server may then contact each vehicle for the requested data. Input/output module 7020 may also communicate with a certificate authority over the long range wireless link. In some examples, Input/output module 7020 may communicate with a location register over the long term wireless link.

Control module 7030 may send discovery requests to the data authority via the input/output module 7020 and may process the response. Control module may utilize the encryption and decryption module 7065 to encrypt and decrypt messages and responses. Encryption and decryption module 7065 may be responsible for obtaining public keys of the data authority from a certificate authority via the input/output module 7020. Control module may also generate access requests based upon the type of data requested by the user. Digital rights management module 7060 may be responsible for managing the content protection in the data returned by the data authority.

Control module 7030 may also request data from the data authority based upon user input from the authority figure. Once the data is received from the data authority, the DRM module 7060 and the data processing module 7070 may process the data. For example, the data may be placed in storage 7090. In some examples, the data may be retransmitted to another location via the input/output module 7020, and in other examples it may be presented to the authority figure through presentation module 7080. The usage of the data may be restricted by the digital rights management employed by the data authority.

Presentation module 7080 may allow the authority figure to view the available data and the associated permissions (returned as a result of the discovery response in some examples) and select the data the authority figure is interested in receiving. The data, once received, may then be displayed to the authority figure through presentation module 7080. For example, presentation module 7080 may be or control a touch screen user interface display, a voice control system, or the like.

Figure 8:
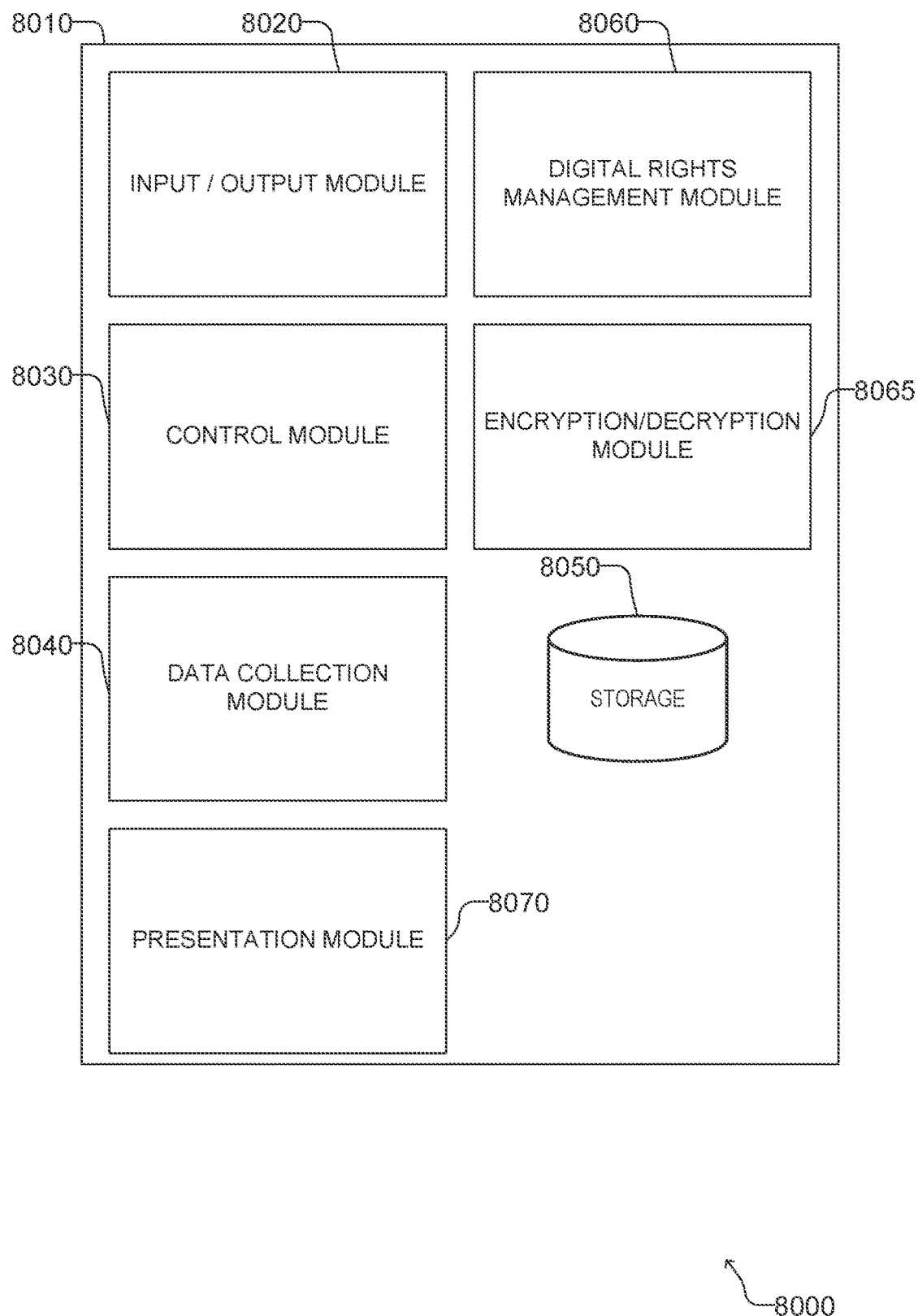
FIG. 8 shows an example schematic of a data authority according to some examples of the present disclosure.

FIG. 8 shows an example schematic 8000 of a data authority 8010 according to some examples of the present disclosure. The various functionality of the data authority may be integrated into a computer system in the vehicle, or may be spread across multiple physical devices. As already noted, the data authority 8010 may be a computer system in the vehicle which may be accessed by the trusted authority directly through one or more wireless links, or indirectly through a network (e.g., the Internet). In addition, the data authority 8010 may instead be located at least partially at a central server. In those particular examples, the trusted authority may then contact the central server over a network and communicate with the central server. The central server may then contact each vehicle which may then provide the requested data.

Input/output module 8020 may communicate with a trusted authority to respond to inquiries and to provide sensor data. Input/output module 8020 may communicate with the trusted authority through short range wireless links such as BLUETOOTH, Wi-Fi, Wi-Fi Direct, ZigBee, Near Field Communications (NFC), or the like. Input/output module 8020 may also communicate with the trusted authority over a network through a long range wireless link such as $4^{th}$ generation wireless data links (e.g., Long Term Evolution (LTE)), $3^{rd}$ generation wireless data links (e.g., Universal Mobile Telecommunications Service (UMTS), $2^{nd}$ generation wireless links (e.g., such as General Packet Radio Service (GPRS)) or the like. Input/output module 8020 may also communicate with a certificate authority over the long range wireless link. In some examples, input/output module 8020 may communicate with a location register over the long term wireless link. Input/output module 8020 may also be linked over one or more interconnects to one or more sensors in the vehicle. For example, Input/Output module 8020 may be capable of communicating with various integrated automotive sensors over a controller area network (CAN) bus interface. Other ways of communicating with sensors may be supported and may include a short range wireless interface such as BLUETOOTH, Near Field Communications (NFC), Radio Frequency identification (RFD), and the like.

Control module 8030 may receive discovery requests from the trusted authority via the input/output module 80:20 and may generate an appropriate response based upon the sensor data it has available to it or based upon a list of available data. For example, data collection module 8040 may periodically poll various sensors via the input/output module 8020, or may receive sensor data automatically from the sensors via the input/output module 8020. This sensor data may be stored in storage 8050. In alternative examples, the data collection module 8040 may only collect data on request. In these examples, a list of available data may be stored in storage 8050. Control module may utilize the encryption and decryption module 8065 to encrypt and decrypt responses. Encryption and decryption module 8065 may be responsible for obtaining public keys of the trusted authority from a certificate authority via the input/output module 8020. Control module may also respond to access requests by consulting digital rights management module 8060 and by consulting the user preferences, which may be stored in storage 8050. Digital rights management module 8060 may be responsible for content protecting the data returned by the data collection module 8040 prior to transmission to the trusted authority in accordance with the user preferences and permissions. DRM module 8060 may also advise the control module 8030 on the preferences of the user with respect to the data types that are available.

Control module 8030 may also respond to the data stream requests by checking to see if the requested data stream is allowed and by causing the data collection module 8040 to transmit the data after it is content protected appropriately by the DRM module 8060.

Presentation module 8070 may inform the occupants of the automobile of status of the process and accept input and provide output in order to allow the user to have control over what data is sent. For example, presentation module 8070 may be or control a touch screen user interface display, a voice control system, or the like.

In other examples, the trusted authority may request permission to view the data from a judicial authority in addition to, or instead of, the data authority. For example, a trusted authority may contact a judicial computing system to obtain a warrant to access data on the data authority. The warrant that is returned by the judicial computing system may include a digital signature verifying that the warrant was from a judicial authority. The trusted authority may then forward this warrant as part of the data request. Upon receipt of this warrant, the data authority may grant access regardless of the permissions granted by the vehicle occupants and begin sending data.

While many embodiments disclosed herein are directed at police encounters, other uses are possible. For example, if a car with a data authority is involved in an accident, the data authority may log all data for a period of time before and after the accident. This may include contacting other data authorities for nearby vehicles and logging, or asking them to store, sensor data and identification data. Thus police may be able to better reconstruct an accident and may be able to determine witnesses. In other examples, ambulances may have a trusted authority system. After an accident, the ambulance may request sensor data of the car (including sensor data which may provide information on attributes of the car before and after the accident) as well as information on occupants of the car. Additionally, in some examples, an occupant's medical insurance card may be equipped with smart card technology which may incorporate medical information that may be read by the data authority and then passed on to the trusted authority of emergency crews in an accident situation. In some examples, during an accident situation, the driver may not be able to grant permissions. In these examples, the data authority may provide the data to emergency crews regardless of user permissions. In other examples, the user or occupants may specify ahead of time certain data that may be automatically provided after a crash. Thus when the car detects a collision (e.g., through detection of an airbag deployment), the car may switch to the permissions specified by the user in the event of an accident. Thus the permissions may be made even more granular to specify different permissions for each situation in which the data authority may be presented.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computing devices (e.g., a standalone, client or server computing device) or one or more hardware modules of a computing device (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output, Method operations may also be performed by, and apparatus of example embodiments may be implemented as, special purpose logic circuitry (e.g., a FPGA or an ASIC).

The computing device may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
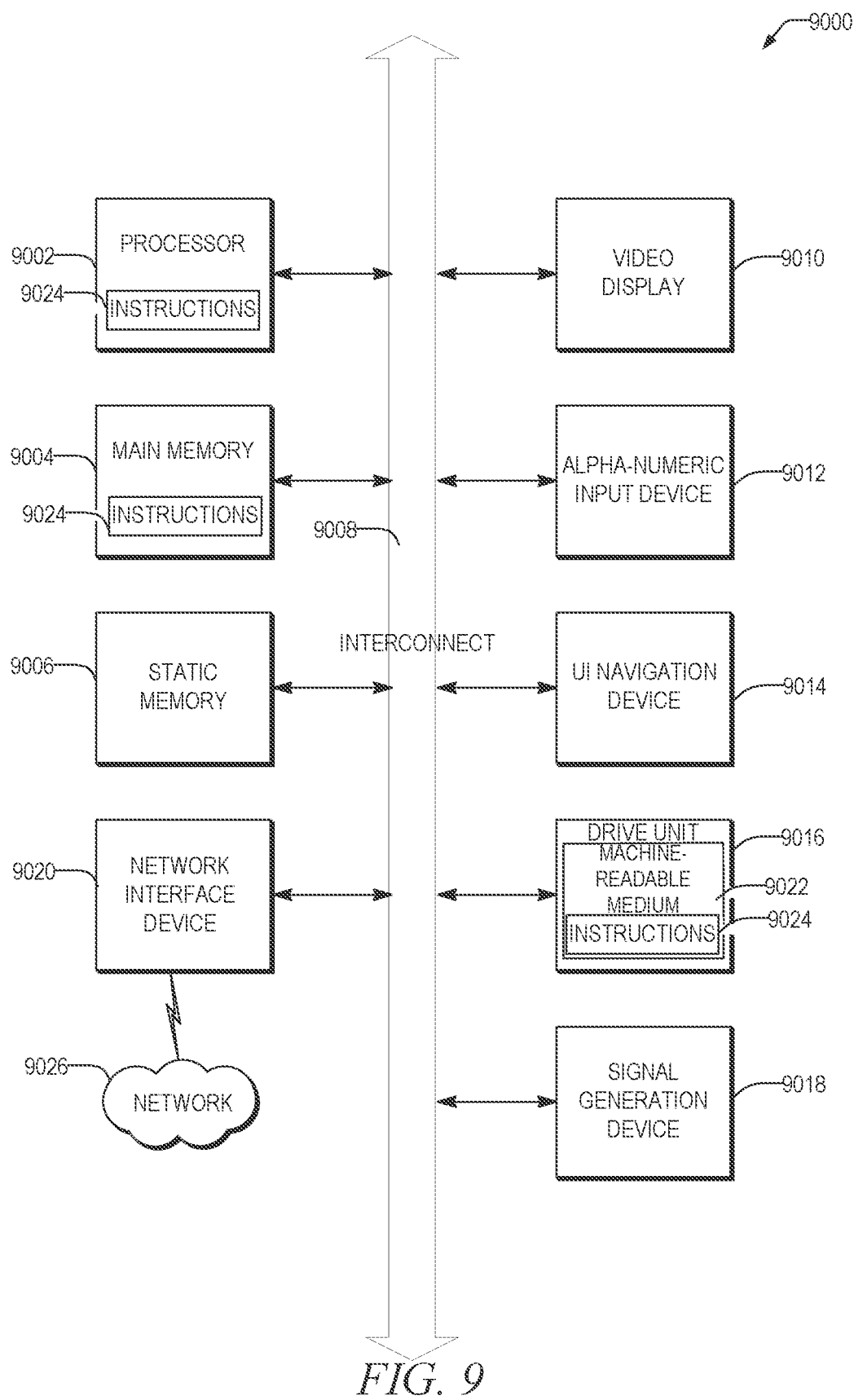
FIG. 9 is a block diagram of a machine in the example form of a computing device within which instructions, for causing the machine to perform any one or more of the methodologies discussed herein, may be executed.

FIG. 9 is a block diagram of a machine in the example form of a computing device 9000 within which instructions, for causing the machine to perform any one or more of the methodologies discussed herein, may be executed. For example, any one of the components shown in FIG. 1-3, 7, or 8 may be or contain one or more of the components described in FIG. 9. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 9 or only a subset of the components shown in FIG. 9.

The example computing device 9000 includes a processor 9002 (e.g., a central processing unit (CPU), a graphics processing unit (GPU) or both), a main memory 9004 and a static memory 9006, which communicate with each other via an interconnect 9008 (e.g., bus or link). The computing device 9000 may further include a video display unit 9010 (e.g., a liquid crystal display (LCD) or a cathode ray tube (CRT)). The computing device 9000 may also include an alphanumeric input device 9012 (e.g., a keyboard), a user interface (UI) navigation device 9014 (e.g., a mouse), a disk drive unit 9016, a signal generation device 9018 (e.g., a speaker) and a network interface device 9020.

Machine-Readable Medium

The disk drive unit 9016 includes a machine-readable medium 9022 on which is stored one or more sets of instructions and data structures (e.g., software) 9024 embodying or used by any one or more of the methodologies or functions described herein. The instructions 9024 may also reside, completely or at least partially, within the main memory 9004, static memory 9006, and/or within the processor 9002 during execution thereof by the computing device 9000, the main memory 9004 and the processor 9002 also constituting machine-readable media.

While the machine-readable medium 9022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media, Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 9024 may further be transmitted or received over a communications network 9026 using a transmission medium. The instructions 9024 may be transmitted using the network interface device 9020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 9020 may wirelessly transmit data and may include an antenna.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER EXAMPLES

The following are illustrative and non-limiting examples.

Example 1 includes subject matter (such as a method, means for performing acts, machine readable medium including instructions) comprising a method performed at a trusted authority, the method including establishing a wireless communication session with a data authority, the data authority integrated in a nearby vehicle; performing a discovery process with the data authority, the discovery process informing the data authority of a plurality of data types that are available to the trusted authority, the plurality of data types that are available related to an attribute of the nearby vehicle; receiving information on a data type of interest, the data type of interest among the plurality of data types that are available; performing an access request process, the access request process determining the access rights granted by the data authority to the trusted authority for the data type of interest; requesting data corresponding to the data type of interest; receiving the data corresponding to the requested data type of interest; and presenting the data to a public official in the course of their official public duties in accordance with the access rights granted to the data.

In example 2, the subject matter of example 1 may optionally include, wherein the wireless communication session is a direct communication session.

In example 3, the subject matter of one or more of examples 1-2 may optionally include, wherein the wireless communication session is one of: a Wi-Fi Direct communication session, a BLUETOOTH communication session, a ZigBee communication session, and a Near Field Communications communication session.

In example 4, the subject matter of one or more of examples 1-3 may optionally include, wherein the wireless communication session is through a network.

In example 5, the subject matter of one or more of examples 1-4 may optionally include, determining a Uniform Resource Identifier (URI) corresponding to the data authority; sending the URI to a location register over the network; receiving an Internet Protocol (IP) address of the data authority from the location register; and wherein establishing the wireless communication session includes contacting the data authority using the IP address.

In example 6, the subject matter of one or more of examples 1-5 may optionally include, wherein the access rights grant the trusted authority the ability to perform at least: viewing the data, storing the data, and retransmitting the data.

In example 7, the subject matter of one or more of examples 1-6 may optionally include determining a Uniform Resource Identifier (URI) corresponding to the data authority; contacting a certificate authority to retrieve a public key for the data authority; and encrypting messages sent to the data authority using the public key.

Example 8 includes or may optionally be combined with the subject matter of any one of examples 1-7 to include subject matter (such as a device, apparatus, or machine) including a trusted authority system including: an input and output module configured to: establish a wireless communication session with a data authority, the data authority integrated in a nearby vehicle; a control module configured to: perform a discovery process with the data authority, the discovery process informing the data authority of a plurality of data types that are available to the trusted authority, the plurality of data types that are available related to an attribute of the nearby vehicle; receive information on a data type of interest, the data type of interest among the plurality of data types that are available; perform an access request process, the access request process determining the access rights granted by the data authority to the trusted authority for the data type of interest; request data corresponding to the data type of interest; wherein the input and output module is configured to receive the data corresponding to the data type of interest; and a presentation module configured to: present the data to a public official in the course of their official public duties in accordance with the access rights granted to the data.

In example 9, the subject matter of any one or more of examples 1-8 may optionally include, wherein the wireless communication session is a direct communication session.

In example 10, the subject matter of any one or more of examples 1-9 may optionally include, wherein the wireless communication session is one of: a Wi-Fi Direct communication session, a BLUETOOTH communication session, a ZigBee communication session, and a Near Field Communications communication session.

In example 11, the subject matter of any one or more of examples 1-10 may optionally include, wherein the wireless communication session is through a network.

In example 1:2, the subject matter of any one or more of examples 1-10 may optionally include, wherein the control module is further configured to: determine a Uniform Resource Identifier (URI) corresponding to the data authority; send the URI to a location register over the network; receive an Internet Protocol (IP) address of the data authority from the location register; and wherein establishing the wireless communication session includes contacting the data authority using the IP address.

In example 13, the subject matter of any one or more of examples 1-12 may optionally include, wherein the access rights grant the trusted authority the ability to perform at least: viewing the data, storing the data, and retransmitting the data.

In example 14, the subject matter of any one or more of examples 1-13 may optionally include, wherein the control module is further configured to: determine a Uniform Resource Identifier (URI) corresponding to the data authority; and wherein the system further comprises an encryption module configured to: contact a certificate authority to retrieve a public key for the data authority; and encrypt messages sent to the data authority using the public key.

Example 15 includes or may optionally be combined with the subject matter of any one of examples 1-14 to include subject matter (such as a method, means for performing acts, machine readable medium including instructions for) comprising at a trusted authority: establishing a wireless communication session with a data authority, the data authority integrated in a nearby vehicle; performing a discovery process with the data authority, the discovery process informing the data authority of a plurality of data types that are available to the trusted authority, the plurality of data types that are available related to an attribute of the nearby vehicle; receiving information on a data type of interest, the data type of interest among the plurality of data types that are available; performing an access request process, the access request process determining the access rights granted by the data authority to the trusted authority for the data type of interest; requesting data corresponding to the data type of interest; receiving the data corresponding to the requested data type of interest; and presenting the data to a public official in the course of their official public duties in accordance with the access rights granted to the data.

In example 16, the subject matter of one or more of examples 1-15 may optionally include, wherein the wireless communication session is a direct communication session.

In example 17, the subject matter of one or more of examples 1-16 may optionally include, wherein the wireless communication session is one of: a Wi-Fi Direct communication session, a BLUETOOTH communication session, a ZigBee communication session, and a Near Field Communications communication session.

In example 18, the subject matter of one or more of examples 1-17 may optionally include, wherein the wireless communication session is through a network.

In example 19, the subject matter of one or more of examples 1-18 may optionally include, wherein the instructions further include instructions, which when performed by the machine, cause the machine to perform the operations including: determining a Uniform Resource identifier (URI) corresponding to the data authority; sending the URI to a location register over the network; receiving an Internet Protocol (IP) address of the data authority from the location register; and wherein establishing the wireless communication session includes contacting the data authority using the IP address.

In example 20, the subject matter of one or more of examples 1-19 may optionally include, wherein the access rights grant the trusted authority the ability to perform at least: viewing the data, storing the data, and retransmitting the data.

In example 21, the subject matter of one or more of examples 1-20 may optionally include, wherein the instructions further include instructions, which when performed by the machine, cause the machine to perform the operations including: determining a Uniform Resource Identifier (URI) corresponding to the data authority; contacting a certificate authority to retrieve a public key for the data authority; and encrypting messages sent to the data authority using the public key.

Example 22 includes or may optionally be combined with the subject matter of any one of examples 1-21 to include subject matter (such as a method, means for performing acts, machine readable medium including instructions) comprising establishing a wireless communication session with a trusted authority, the trusted authority integrated in a nearby vehicle and operated by a public official in the course of their official public duties; responding to a discovery request with an indication of one or more available data types, the available data types related to an attribute of the vehicle; receiving a request for data corresponding to the one or more available data types; informing the trusted authority of access rights corresponding to the data; receiving an access request for the data; collecting the data by communicating with at least one on-board sensor in the vehicle; and sending the data responsive to receiving a request for the data.

In example 23, the subject matter of one or more of examples 1-22 may optionally include, wherein the wireless communication session is a direct communication session.

In example 24, the subject matter of one or more of examples 1-23 may optionally include, wherein the wireless communication session is one of: a Wi-Fi Direct communication session, a BLUETOOTH communication session, a ZigBee communication session, and a Near Field Communications communication session.

In example 25, the subject matter of one or more of examples 1-24 may optionally include, wherein the wireless communication session is through a network.

In example 26, the subject matter of one or more of examples 1-25 may optionally include, wherein the access rights grant the trusted authority the ability to perform at least: viewing the data, storing the data, and retransmitting the data.

In example 27, the subject matter of one or more of examples 1-26 may optionally include, determining a Uniform Resource Identifier (URI) corresponding to the trusted authority; contacting a certificate authority to retrieve a public key for the trusted authority; and encrypting messages sent to the trusted authority using the public key.

In example 28, the subject matter of one or more of examples 1-27 may optionally include, wherein the URI includes a license plate number of the trusted authority.

Example 29 includes or may optionally be combined with the subject matter of any one of examples 1-28 to include subject matter (such as a device, apparatus, or machine) comprising a data authority integrated into a vehicle, the data authority including an input and output module configured to: establish a wireless communication session with a trusted authority, the trusted authority integrated in a nearby vehicle and operated by a public official in the course of their official public duties; a control module configured to: respond to a discovery request with an indication of one or more available data types, the available data types related to an attribute of the vehicle; receive a request for data corresponding to the one or more available data types; inform the trusted authority of access rights corresponding to the data; receive an access request for the data; and wherein the input and output module is further configured to: collect the data by communicating with at least one on-board sensor in the vehicle; and send the data responsive to receiving a request for the data.

In example 30, the subject matter of one or more of examples 1-29 may optionally include, wherein the wireless communication session is a direct communication session.

In example 31, the subject matter of one or more of examples 1-30 may optionally include, wherein the wireless communication session is one of: a Wi-Fi Direct communication session, a BLUETOOTH communication session, a ZigBee communication session, and a Near Field Communications communication session.

In example 3:2, the subject matter of one or more of examples 1-31 may optionally include, wherein the wireless communication session is through a network.

In example 33, the subject matter of one or more of examples 1-32 may optionally include, wherein the access rights grant the trusted authority the ability to perform at least: viewing the data, storing the data, and retransmitting the data.

In example 34, the subject matter of one or more of examples 1-33 may optionally include, an encryption module configured to: determine a Uniform Resource Identifier (URI) corresponding to the trusted authority; contact a certificate authority to retrieve a public key for the trusted authority; and encrypt messages sent to the trusted authority using the public key.

In example 35, the subject matter of one or more of examples 1-34 may optionally include, wherein the URI includes a license plate number of the trusted authority.

Example 36 includes or may optionally be combined with the subject matter of any one of examples 1-35 to include subject matter (such as a method, means for performing acts, machine readable medium including instructions) comprising at a data authority: establishing a wireless communication session with a trusted authority, the trusted authority integrated in a nearby vehicle and operated by a public official in the course of their official public duties; responding to a discovery request with an indication of one or more available data types, the available data types related to an attribute of the vehicle; receiving a request for data corresponding to the one or more available data types; informing the trusted authority of access rights corresponding to the data; receiving an access request for the data; collecting the data by communicating with at least one on-board sensor in the vehicle; and sending the data responsive to receiving a request for the data.

In example 37, the subject matter of one or more of examples 1-36 may optionally include, wherein the wireless communication session is a direct communication session.

In example 38, the subject matter of one or more of examples 1-37 may optionally include, wherein the wireless communication session is one of: a Wi-Fi Direct communication session, a BLUETOOTH communication session, a ZigBee communication session, and a Near Field Communications communication session.

In example 39, the subject matter of one or more of examples 1-38 may optionally include, wherein the wireless communication session is through a network.

In example 40, the subject matter of one or more of examples 1-39 may optionally include, wherein the access rights grant the trusted authority the ability to perform at least: viewing the data, storing the data, and retransmitting the data.

In example 41, the subject matter of one or more of examples 1-40 may optionally include determining a Uniform Resource Identifier (URI) corresponding to the trusted authority; contacting a certificate authority to retrieve a public key for the data authority; and encrypting messages sent to the data authority using the public key.

In example 42, the subject matter of one or more of examples 1-41 may optionally include, wherein the URI includes a license plate number of the trusted authority.

What is claimed is:

1. A component of a vehicle information system for a vehicle, comprising:
   at least one processor; and
   memory including instructions that, when executed by the at least one processor, cause the at least one processor to:
   receive a request from a client to initiate a communication session with the vehicle information system;
   receive a request, in the communication session, to identify data made available in the vehicle information system;
   respond to the client, in the communication session, with an identification of data made available in the vehicle information system, wherein the data made available in the vehicle information system is controlled by an owner of the vehicle;
   receive a request from the client, in the communication session, to obtain the data made available from the vehicle information system;
   check access rights for the data that are granted to the client, wherein access to the data is controlled by the vehicle information system; and
   transmit the data to the client, in the communication session, in accordance with the access rights.

2. The component of claim 1, wherein the communication session occurs using a Wi-Fi communication protocol.

3. The component of claim 1, wherein the client is operated by an emergency service entity.

4. The component of claim 1, wherein the client is operated by a traffic management system entity.

5. The component of claim 1, wherein the data indicates a locked or unlocked state of a door of a vehicle including the component.

6. The component of claim 1, wherein the data indicates a position of a window of a vehicle including the component.

7. The component of claim 1, wherein the data indicates a speed of a vehicle including the component.

8. The component of claim 1, wherein the data communicated between the client and the vehicle information system is encrypted.

9. The component of claim/wherein the communication session between the client and the vehicle information system is encrypted.

10. The component of claim 9, wherein data in the communication session is encrypted using a Public Key Infrastructure (PKI) public key.

11. A vehicle comprising:
    a vehicle control system; and
    a vehicle information system, in communication with the vehicle control system, the vehicle information system configured to:
    process a request, received from a client, to initiate a communication session with the vehicle information system;
    process a request, received from the client in the communication session, to identify data made available in the vehicle information system;
    provide a response to the client, in the communication session, with an identification of data made available in the vehicle information system, wherein the data made available in the vehicle information system is controlled by an owner of the vehicle;
    process a request, received from the client in the communication session, to obtain the data made available from the vehicle, the data relating to the vehicle control system;
    check access rights for the data that are granted to the client, wherein access to the data is controlled by the vehicle information system; and
    communicate the data to the client, in the communication session, in accordance with the access rights.

12. The vehicle of claim 11, further comprising communications circuitry, wherein the communication session occurs via the communications circuitry using a Wi-Fi communication protocol.

13. The vehicle of claim 11, wherein the client is operated by an emergency service entity or a traffic management system entity.

14. The vehicle of claim 11, wherein the data indicates a locked or unlocked state of a door of the vehicle.

15. The vehicle of claim 11, wherein the data indicates a position of a window of the vehicle.

16. The vehicle of claim 11, wherein the data indicates a speed of the vehicle.

17. The vehicle of claim 11, wherein the data communicated between the client and the vehicle information system is encrypted.

18. The vehicle of claim 11, wherein the communication session between the client and the vehicle information system is encrypted.

19. The vehicle of claim 18, wherein data in the communication session is encrypted using a Public Key Infrastructure (PKI) public key.

20. A method, comprising:
receiving a request from a client to initiate a communication session with a vehicle information system of a vehicle;
receiving a request, in the communication session, to identify data made available in the vehicle information system;
responding to the client, in the communication session, with an identification of data made available in the vehicle information system, wherein the data made available in the vehicle information system is controlled by an owner of the vehicle;
receiving a request from the client, in the communication session, to obtain the data made available from the vehicle information system;
checking access rights for the data that are granted to the client, wherein access to the data is controlled by the vehicle information system; and
transmitting the data to the client, in the communication session, in accordance with the access rights.

21. The method of claim 20, wherein the communication session occurs using a Wi-Fi communication protocol.

22. The method of claim 20, wherein the client is operated by an emergency service entity.

23. The method of claim 20, wherein the client is operated by a traffic management system entity.

24. The method of claim 20, wherein the data indicates a locked or unlocked state of a door of a vehicle including the vehicle information system.

25. The method of claim 20, wherein the data indicates a position of a window of a vehicle including the vehicle information system.

26. The method of claim 20, wherein the data indicates a speed of a vehicle including the vehicle information system.

27. The method of claim 20, wherein the data communicated between the client and the vehicle information system is encrypted.

28. The method of claim 20, wherein the communication session between the client and the vehicle information system is encrypted.

29. The method of claim 28, wherein the data in the communication session is encrypted using a Public Key Infrastructure (PKI) public key.

\* \* \* \* \*

UNITED STATES PATENT AND TRADEMARK OFFICE
CERTIFICATE OF CORRECTION

| | |
|---|---|
| PATENT NO. | : 11,304,057 B2 |
| APPLICATION NO. | : 16/710712 |
| DATED | : April 12, 2022 |
| INVENTOR(S) | : Scholl et al. |

It is certified that error appears in the above-identified patent and that said Letters Patent is hereby corrected as shown below:

In the Claims

In Column 22, Line 26, in Claim 9, delete "claim/wherein" and insert --claim 1, wherein-- therefor Signed and Sealed this
First Day of November, 2022

Katherine Kelly Vidal
*Director of the United States Patent and Trademark Office*